(12) United States Patent
Kosaka

(10) Patent No.: US 11,593,051 B2
(45) Date of Patent: Feb. 28, 2023

(54) IMAGE FORMATION SYSTEM, INFORMATION PROCESSING APPARATUS, AND INFORMATION PROCESSING METHOD FOR INTEGRATED COMMAND PRINTING

(71) Applicant: KYOCERA Document Solutions Inc., Osaka (JP)

(72) Inventor: Naohiko Kosaka, Dublin, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/372,534

(22) Filed: Jul. 12, 2021

(65) Prior Publication Data

US 2023/0011139 A1    Jan. 12, 2023

(51) Int. Cl.
G06F 3/12 (2006.01)

(52) U.S. Cl.
CPC .......... *G06F 3/1296* (2013.01); *G06F 3/1206* (2013.01); *G06F 3/126* (2013.01); *G06F 3/1222* (2013.01); *G06F 3/1238* (2013.01); *G06F 3/12* (2013.01)

(58) Field of Classification Search
CPC .... G06F 3/1296; G06F 3/1206; G06F 3/1222; G06F 3/1238; G06F 3/126; G06F 3/12
USPC ....................................................... 358/1.15
See application file for complete search history.

(56) References Cited

U.S. PATENT DOCUMENTS

| | | | |
|---|---|---|---|
| 9,377,980 B2* | 6/2016 | Park | G06F 3/122 |
| 9,858,516 B2* | 1/2018 | Mandaknale | G06F 3/1222 |
| 2004/0036903 A1* | 2/2004 | Azami | G06K 15/1807 |
| | | | 358/1.15 |
| 2013/0194634 A1* | 8/2013 | Sankaranarasimhan | |
| | | | G06F 3/1228 |
| | | | 358/1.15 |

FOREIGN PATENT DOCUMENTS

JP      2001-282470 A    10/2001

* cited by examiner

*Primary Examiner* — Darryl V Dottin
(74) *Attorney, Agent, or Firm* — Hawaii Patent Services; Nathaniel K. Fedde; Kenton N. Fedde

(57) ABSTRACT

Provided is an image forming system that can obtain similar output results. The job generation unit generates a job and adds a command including a document acquisition destination to the job. The job transmission unit sends a job to which a command is added. The job acquisition unit acquires the job from the terminal. The command analysis unit analyzes the commands included in the acquired job. The document acquisition unit acquires a document from the acquisition destination according to the analyzed command. The rendering unit renders the acquired document and generates output data. The output transmission unit transmits the rendered output data. The output data acquisition unit acquires the output data. The image forming unit forms an image of the output data.

20 Claims, 8 Drawing Sheets

| | | |
|---|---|---|
| Type | HTML | |
| Source | https://www.weather_news_etc.com/concord.html | |
| Request | Safari-park | |
| Destination | 10.10.**.81 | |
| Schedule | REPEAT EVERY 24 HOURS | |
| Print settings | Color = MONO, Range = 1-3, Copies = 2, etc. | |

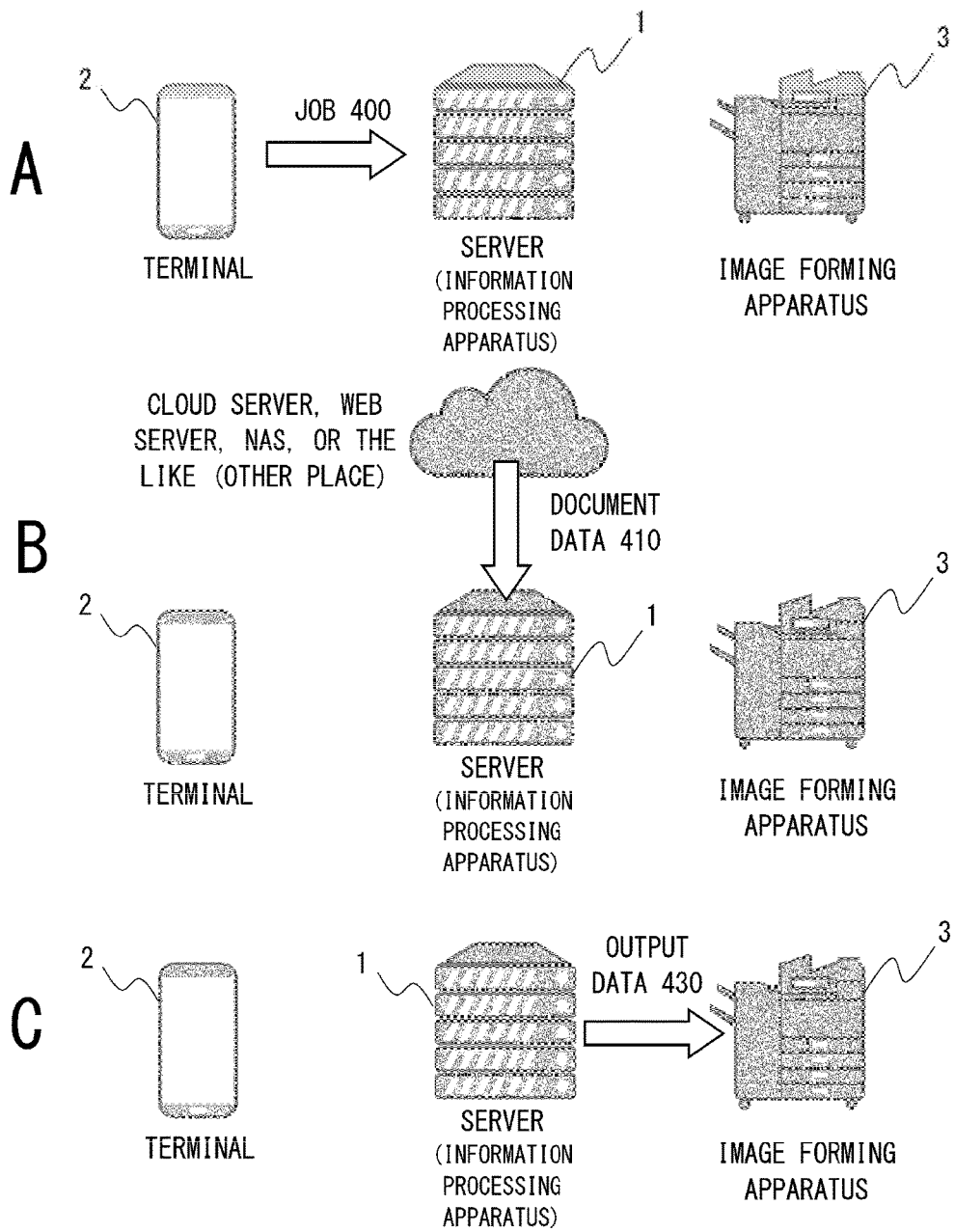

IMAGE FORMATION SYSTEM, INFORMATION PROCESSING APPARATUS, AND INFORMATION PROCESSING METHOD FOR INTEGRATED COMMAND PRINTING

BACKGROUND

The present disclosure particularly relates to an image forming system, an information processing apparatus, and an information processing method that output from a terminal via a server.

There are image forming apparatuses such as multifunctional peripherals (MFPs) that can print documents and images.

A typical image forming apparatus, after determining whether the data files that can be processed by the own apparatus, if it is a data file that can be processed by own apparatus, RIP processing (Raster Image Processor, rasterize, hereinafter simply an image forming apparatus that performs "rasterization") on its own is disclosed. In this image forming apparatus, when it is a data file that cannot be processed by its own machine, the server is made to generate image data for executing printing based on the data file.

SUMMARY

The image forming system of the present disclosure is an image forming system having a terminal, an information processing apparatus, and an image forming apparatus, wherein the terminal includes: a job generating unit configured to generate a job and adds a command that includes a document acquisition destination to the job, and a job transmission unit configured to transmit the job to which the command is added by the job generation unit; the information processing apparatus includes: a job acquisition unit configured to acquire the job from the terminal, a command analysis unit configured to analyze the command included in the job acquired by the job acquisition unit, a document acquisition unit configured to acquire the document from the acquisition destination according to the command analyzed by the command analysis unit, a rendering unit configured to render the document acquired by the document acquisition unit and generates output data, and an output transmission unit configured to transmit the output data rendered by the rendering unit; and the image forming apparatus includes: an output data acquisition unit configured to acquire the output data, and an image forming unit configured to form an image of the output data.

The information processing apparatus of the present disclosure is an information processing apparatus for an image formation system, including: a job acquisition unit configured to acquire a job from a terminal; a command analysis unit configured to analyze the command included in the job acquired by the job acquisition unit; a document acquisition unit configured to acquire the document from the acquisition destination added in the command analyzed by the command analysis unit; a rendering unit configured to render the document acquired by the document acquisition unit and generates output data; and an output transmission unit configured to transmit the output data rendered by the rendering unit.

The information processing method of the present disclosure is an information processing method executed by the information processing apparatus of the image forming system, including the steps of: acquiring a job from a terminal; analyzing the command included in acquired job; acquiring the document from the acquisition destination added in analyzed command; rendering acquired document and generating output data; and transmitting rendered output data.

BRIEF DESCRIPTION OF THE DRAWINGS

FIG. 6 is a table showing an example of the command as shown in FIG. 5;

FIG. 8 is a conceptual diagram of the command printing process as shown in FIG. 7.

DETAILED DESCRIPTION

Embodiment

[System Configuration of Image Forming System X]

Figure 1:
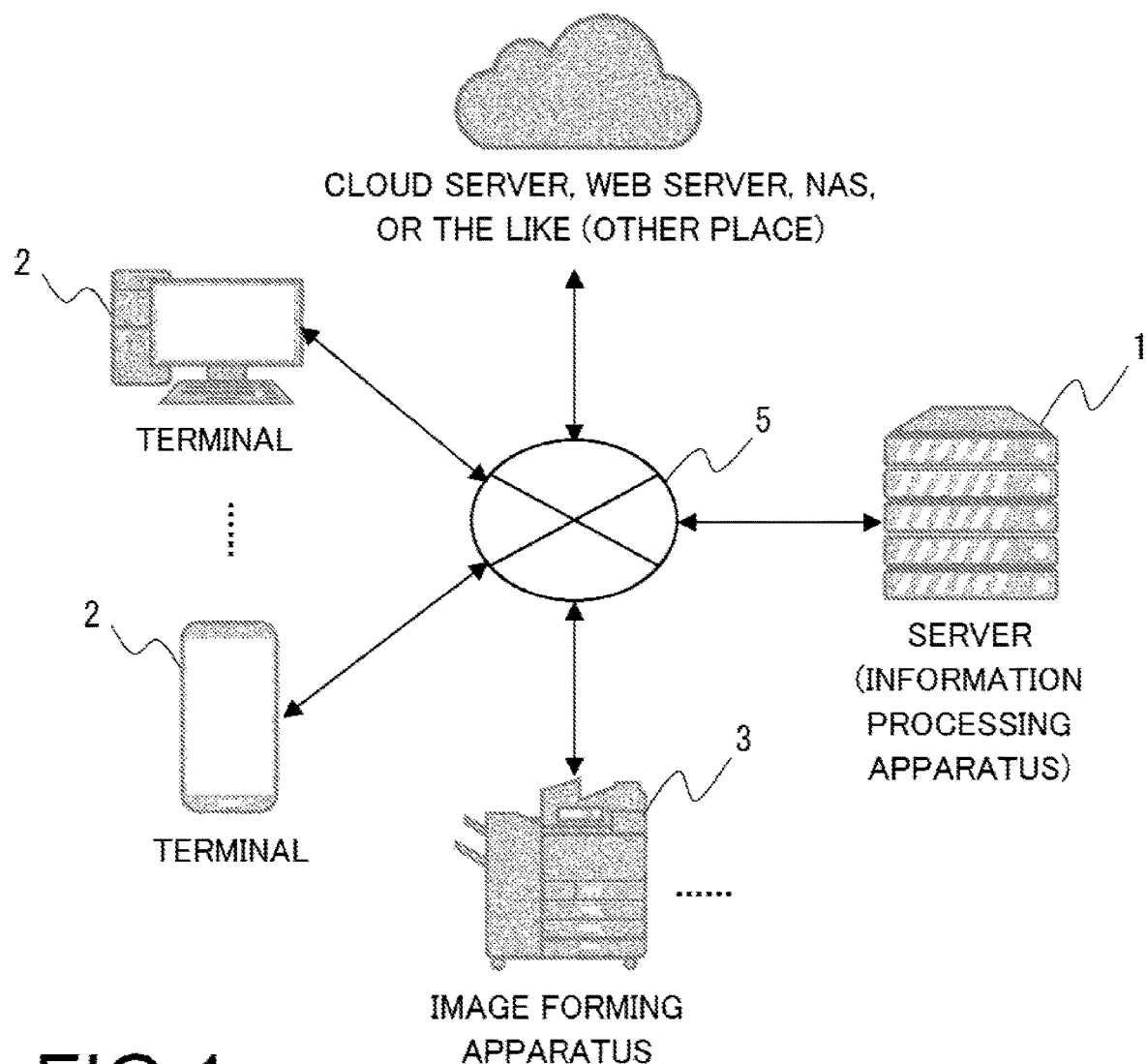
FIG. 1 is a system configuration diagram of an image forming system according to an embodiment of the present disclosure.

At first, the system configuration of the image forming system X according to the present embodiment is described with reference to FIG. 1.

The image forming system X according to the present embodiment is a system that performs comprehensive printing based on a job including a command for printing and outputting (hereinafter, referred to as "integrated command printing"). With this integrated command printing, the same or the similar quality can be achieved regardless of an application program (hereinafter simply referred to as "application") or a device driver (hereinafter, simply referred to as "driver").

The image forming system X according to the present embodiment includes a server 1 (information processing apparatus), one or a plurality of terminals 2, and one or a plurality of image forming apparatuses 3. Each apparatus is connected by network 5.

The server 1 is an information processing apparatus capable of transmitting and receiving various data between the terminal 2 and the image forming apparatus 3. In the present embodiment, the server 1 may be a mainframe, a PC (Personal Computer) server, NAS (Network Attached Storage), or the like. In addition, server 1 executes a general-purpose OS (Operating System), such as Linux (registered trademark) or Windows (registered trademark), and the like, and provides various types of daemons or services on the OS.

Further, for example, the server 1 acquires job 400 (FIG. 5) for instructing printing from the terminal 2, interprets the command 500 included in this job 400, generates output data 430 by acquiring and rendering the specified file. Then, the server 1 outputs the output data 430 with an appropriate image forming apparatus 3.

Further, the server 1 can output the document data 410 stored in the storage unit 19 of the server 1 as a pull print according to an instruction from the image forming apparatus 3.

Further, the server 1 may store the document data 410 (FIG. 5) in the document box (shared folder, storage folder) associated with the user.

In addition, the server 1 may share functions and processes among a plurality of servers. Further, the server 1 may be capable of performing transmission processing to a DMS (Document Management System), or the like, for business or office work.

The terminal 2 is an information processing apparatus such as a PC, a mobile phone, a smartphone, a PDA (Personal Data Assistant), a business terminal, a dedicated terminal for the image forming apparatus 3, and the like.

The terminal 2 executes a various general-purpose OS, and the like. Also, the terminal 2 can install a control program such as the device driver for the image forming apparatus 3, the daemon or services, application, and the like. Thus, the terminal 2 can create and update the job 400 managed by the server 1. The job 400 enables the terminal 2 to use functions such as printing, scanning, fax transmitting and receiving, and network fax of the image forming apparatus 3 from the OS and the various applications.

The image forming apparatus 3 is a MFP, a Networks scanner, a document scanner, a network FAX, a document reading apparatus such as a printer with a scanner function, e-mail transmission server, an SMS transmission apparatus, or the like. The image forming apparatus 3 may execute an application for connecting to the server 1.

The image forming apparatus 3 operates a general-purpose OS (Operating System) such as Linux (registered trademark) or Windows (registered trademark), an embedded OS, a real-time OS, or the like, and the control program on this OS is executed to control each part.

The network 5 includes a LAN (Local Area Network), a wireless LAN (Wi-Fi), a WAN (Wide Area Network), a mobile phone network, a voice phone network, and the like.

In the present embodiment, various files and data can be acquired from a cloud server, a web server, NAS, or the like (hereinafter referred to as "another place") on the Internet, or the like, via the network 5.

Figure 2:
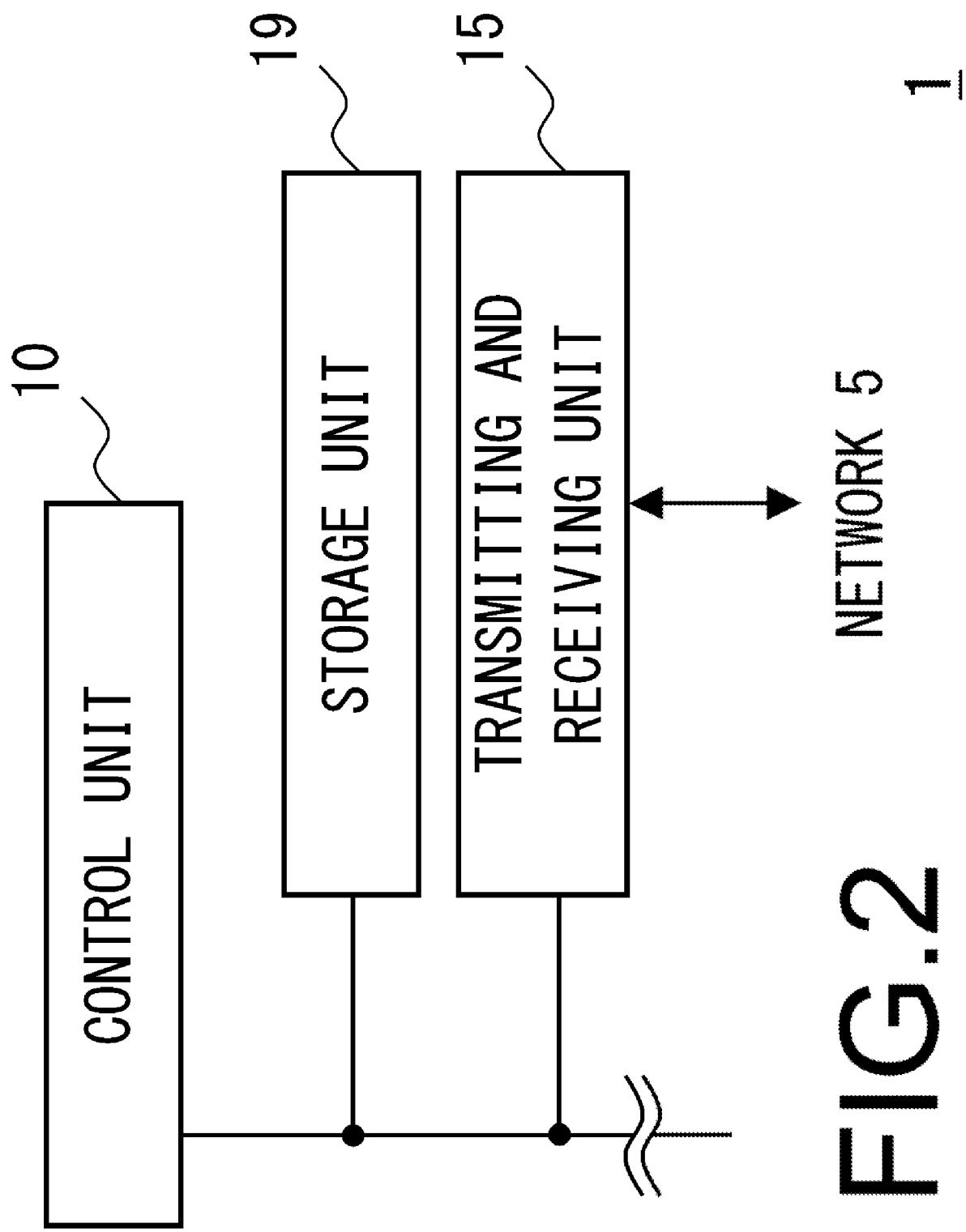
FIG. 2 is a block diagram showing the control configuration of the server as shown in FIG. 1.

Then, with reference to FIG. 2, the configuration of the server 1 according to the present embodiment is described.

The server 1 includes a control unit 10, a transmitting and receiving unit 15, and a storage unit 19.

The control unit 10 is an information processing unit includes a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, that is a processor for specific applications), or the like.

The control unit 10 reads out the control program stored in the ROM or HDD of the storage unit 19, expands the control program in the RAM, and executes the control program, so that the control unit 10 can be operated as each part of the functional block as described later.

The transmitting and receiving unit 15 is a network connection unit including a LAN board, a wireless transceiver, and the like for connecting to the network 5. The transmitting and receiving unit 15 transmits and receives data to the terminal 2 and the image forming apparatus 3.

The storage unit 19 is a non-transitory recording medium including a semiconductor memory such as a ROM (Read Only Memory), a RAM (Random Access Memory), and the like, an HDD (Hard Disk Drive), an optical recording medium, and the like.

The control program for controlling the operation of the server 1 is stored in the ROM or HDD of the storage unit 19. In addition, the storage unit 19 may also store the user's account settings. Further, the storage unit 19 may include an area of a storage folder for each user.

Figure 3:
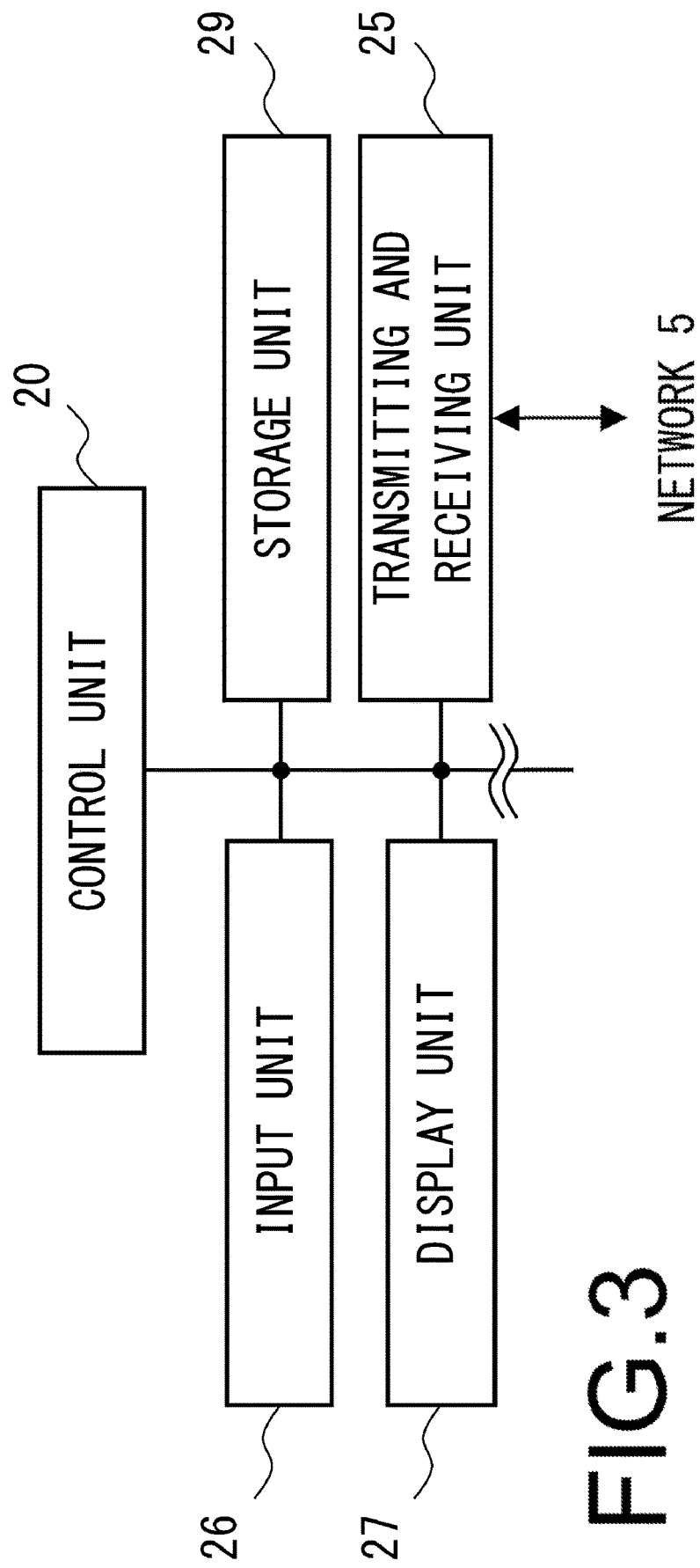
FIG. 3 is a block diagram showing a control configuration of the terminal as shown in FIG. 1.

Next, with reference to FIG. 3, the configuration of the terminal 2 according to the present embodiment is described.

In the terminal 2, a control unit 20, a transmitting and receiving unit 25, an input unit 26, a display unit 27, a storage unit 29, and the like, are connected to the control unit 20. The operation of each part of the terminal 2 is controlled by the control unit 20.

The control unit 20 is an information processing unit includes a CPU, MPU, DSP, GPU, ASIC, or the like.

The control unit 20 executes each program stored in the storage unit 29 by using hardware resources. Specifically, the control unit 20 executes a control program including an OS (Operating System) stored in the storage unit 29, a various daemon and service, and a device driver of the image forming apparatus 3, and a various installed application. As a result, various functions are executed.

The transmitting and receiving unit 25 is a network connection unit for connecting to the network 5. The transmitting and receiving unit 25 includes a LAN board, a wireless transmitter/receiver, a USB (Universal Serial Bus) interface, and the like. The transmitting and receiving unit 25 transmits and receives data to the server 1 and the image forming apparatus 3.

The input unit 26 is an input device such as a touchpanel, keyboard, buttons, mouse, touch pad, optical or electromagnetic digitizer for performing operations by the user, and the like.

The display unit 27 is a display device such as an LCD (Liquid Crystal Display), an organic EL display (Organic Electro-Luminescence Display), and an LED (Light Emitting Diode), or the like.

The input unit 26 and the display unit 27 may be integrally formed so that the input unit 26 can detect the position (coordinates) on the display unit 27.

The storage unit 29 is a non-transitory recording medium such as a RAM, a flash memory disk such as SSD, an HDD, a magnetic tape device, an optical disk device, or the like. The storage unit 29 stores device drivers, various applications 420, other programs, data, and the like, in addition to the OS for making the terminal 2 function as a computer. These programs and data can be executed, read, and written by the control unit 20.

Figure 4:
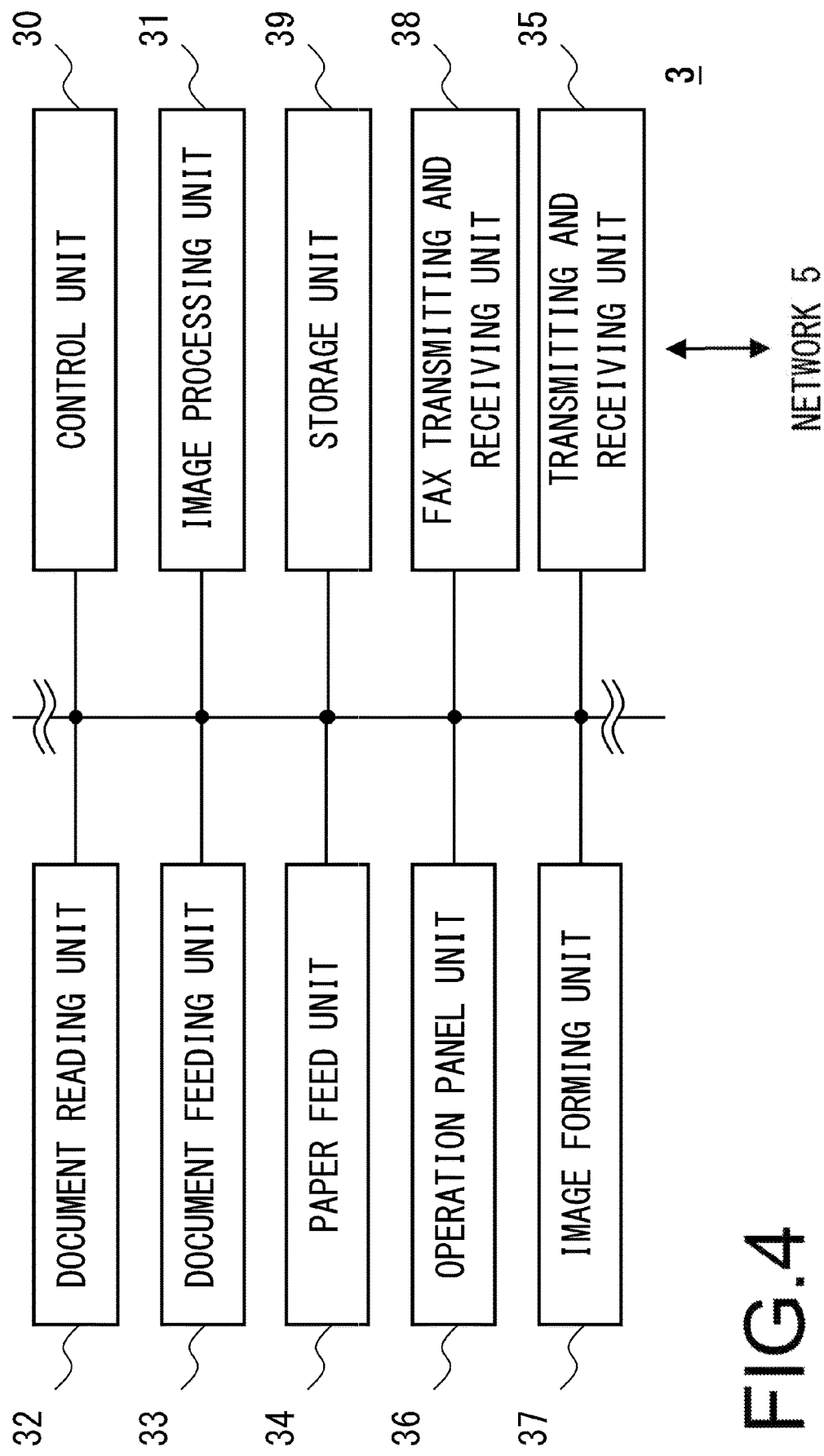
FIG. 4 is a block diagram showing a control configuration of the image forming apparatus as shown in FIG. 1.

Next, with reference to FIG. 4, the configuration of the image forming apparatus 3 according to the present embodiment is described.

The image forming apparatus 3 includes an image processing unit 31, a document reading unit 32, a document feeding unit 33, a paper feed unit 34, a transmitting and receiving unit 35, an operation panel unit 36, an image forming unit 37, and a fax transmitting and receiving unit 38, storage unit 39, or the like. Each unit is connected to the control unit 30 and its operation is controlled by the control unit 30.

The control unit 30 is an information processing unit such as GPP, CPU, MPU, DSP, GPU, ASIC, and the like.

The control unit 30 reads the control program stored in the auxiliary storage unit of the storage unit 39, expands the control program in the main storage unit, and executes the control program. Further, the control unit 30 controls the entire device according to instruction information input from the terminal 2 or the operation panel unit 36.

The image processing unit 31 is a control calculation unit such as a DSP (Digital Signal Processor), a GPU (Graphics Processing Unit), or the like. The image processing unit 31 performs image processing on the image data. For example, the image processing unit 31 performs various image processing such as blank page detection, scaling and rotating, density adjustment, gradation adjustment, noise removal, sharpness improvement, other image quality improvement, or the like.

The document reading unit 32 is a unit for reading (scanning) the set document. Also, the document reading unit 32 is arranged on the upper part of the main body of the image forming apparatus 3. The document reading unit 32 reads the document in synchronization with the document transport operation by the document feeding unit 33 and acquires image data. The document reading unit 32 stores the acquired image data in the storage unit 39.

The document feeding unit 33 is a unit for transporting the document read by the document reading unit 32. The document feeding unit 33 is arranged above the document reading unit 32. The document feeding unit 33 includes a document placing unit and a document transport mechanism. The document feeding unit 33 feeds the documents placed on the document placing unit to the document reading unit 32 one by one by the document transport mechanism.

The paper feed unit 34 is a unit for feeding the recording paper one by one toward the image forming unit 37. The paper feed unit 34 is provided in the main body unit.

The transmitting and receiving unit 35 is a network connection device including a LAN board, a wireless transmitter/receiver, and the like, for connecting to the network 5. The transmitting and receiving unit 35 transmits and receives data to the server 1 and the terminal 2.

The transmitting and receiving unit 35 transmits and receives data on a data communication line, and transmits and receives a voice signal on a voice telephone line.

The operation panel unit 36 includes an input unit such as a button or a touch panel, or the like, and a display unit such as an LCD or an organic EL display, or the like. Further, the operation panel unit 36 is arranged on the front side of the image forming apparatus 3. The buttons of the input unit of the operation panel unit 36 are a numeric keypad, a start button, a cancel button, a switching button of the operation mode, and a button for giving instructions related to execution of the job 400, and the like. The input unit of the operation panel unit 36 acquires various instructions of the image forming apparatus 3 by the user. It is also possible to input and change the information of each user according to the user's instruction acquired from the operation panel unit 36.

The image forming unit 37 is a unit for forming an image on the recording paper from the data stored in the storage unit 39, read by the document reading unit 32, or acquired from the terminal 2 according to the output instruction of the user.

The image forming unit 37 includes a photoconductor drum, an exposure unit, a developing unit, a transfer unit, a fixing unit, and the like. The image forming unit 37 records a toner image on a recording paper by executing an image forming process including charging, exposure, development, transfer, and fixing.

The FAX transmitting and receiving unit 38 is a unit for transmitting and receiving a facsimile. The FAX transmitting and receiving unit 38 can receive a facsimile from another FAX apparatus via a voice line, store the facsimile image data in the storage unit 39, and form an image in the image forming unit 37. Further, the FAX transmitting and receiving unit 38 can convert the document read by the document reading unit 32 or the network FAX data transmitted from the terminal 2 into image data, and it can transmit a facsimile to another FAX apparatus by a voice line.

The storage unit 39 is a non-transitory recording medium by using a semiconductor memory such as a ROM or RAM, and an HDD, or the like.

The RAM of the storage unit 39 may retain the stored contents by a function such as self-refresh even in a power saving state.

The control program for controlling the operation of the image forming apparatus 3 is stored in the ROM or HDD of the storage unit 39. In addition to this, the storage unit 39 may also store the user's account settings. Further, the storage unit 39 may include an area of a document box (save folder, shared folder) for each user.

In addition, in the image forming apparatus 3, the control unit 30 and the image processing unit 31 may be integrally-formed such as a GPU built-in CPU, a chip-on module package, and an SOC (System On a Chip).

Further, the control unit 10, the control unit 20, the control unit 30, and the image processing unit 31 may incorporate a non-transitory recording medium such as a RAM, a ROM, or a flash memory.

[Functional Configuration of Image Forming System X]

Figure 5:
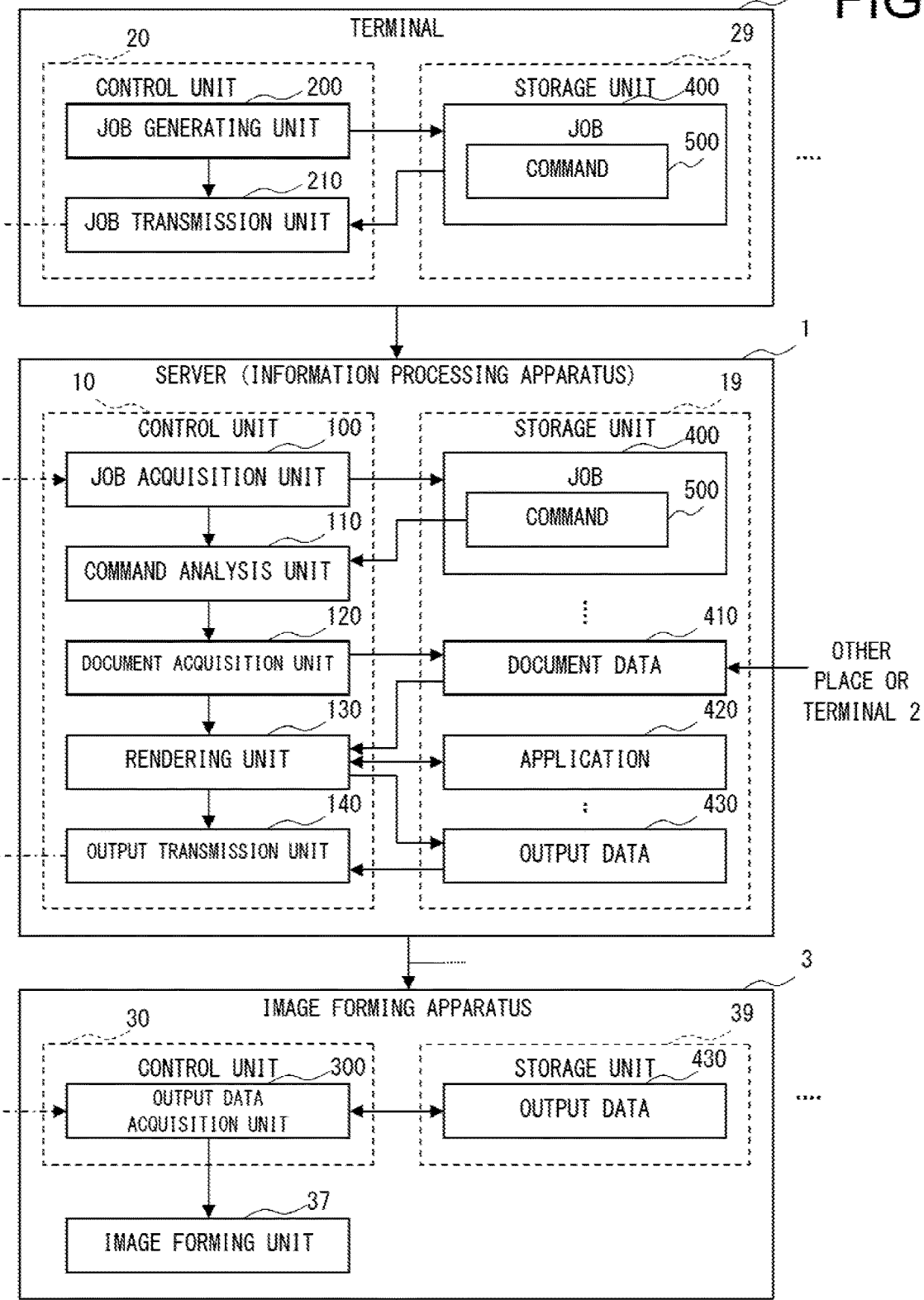
FIG. 5 is a block diagram showing a functional configuration of the image forming system according to the embodiment of the present disclosure.

Here, with reference to FIG. 5, the functional configuration of the image forming system X according to the present embodiment is described.

The control unit 10 of the server 1 includes a job acquisition unit 100, a command analysis unit 110, a document acquisition unit 120, a rendering unit 130, and an output transmission unit 140.

The storage unit 19 of the server 1 stores the job 400, the document data 410, the application 420, and the output data 430.

The control unit 20 of the terminal 2 includes a job generating unit 200 and job transmission unit 210.

The storage unit 29 of the terminal 2 stores the job 400.

The control unit 10 of the image forming apparatus 3 includes an output data acquisition unit 300.

The storage unit 39 of the image forming apparatus 3 stores the output data 430.

The job acquisition unit 100 acquires the job 400 from the terminal 2.

The command analysis unit 110 analyzes the command 500 included in the job 400 acquired by the job acquisition unit 100.

The document acquisition unit 120 acquires the document data 410 from the acquisition destination according to the command 500 analyzed by the command analysis unit 110. When the document data 410 is not included in the job 400, the document acquisition unit 120 may acquire the document data 410 from another place according to the instruction of the acquisition destination (FIG. 6) included in the command 500.

The rendering unit 130 renders the document data 410 acquired by the document acquisition unit 120 to generate the output data 430. That is, in the present embodiment, the rendering is performed not by the terminal 2 but by the server 1.

At this time, the rendering unit 130 can perform rendering by using the set application 420 depending on the specific document data 410.

Specifically, the rendering unit 130 can perform rendering by using the application 420 specified by the command 500.

In addition, the rendering unit 130 can also acquire and render the document according to the schedule set by the command 500.

The output transmission unit 140 transmits the output data 430 rendered by the rendering unit 130. Specifically, the output transmission unit 140 may transmit the output data 430 to the output destination included in the command 500 added to the job 400 via the network 5.

The job generation unit 200 generates a job 400, and it adds a command 500, which includes a document acquisition destination, to the job 400.

The job transmission unit 210 transmits the job 400, which the command 500 is added by the job generation unit 200. Specifically, the job transmission unit 210 may transmit the job 400 to the server 1.

The output data acquisition unit 300 acquires the output data 430 from the server 1. The output data acquisition unit 300 may be able to acquire the output data 430 in the same manner as normal printing by the terminal 2, pull printing, or the like.

In the present embodiment, the image forming unit 37 forms an image of the output data 430 and records it on a recording paper.

The job 400 is data for giving various instructions for image formation in the image forming system X. In the present embodiment, an example in which the job 400 is print job data for giving an instruction to be output by printing, or the like, is described.

In addition, a command 500 is added to the job 400 as data indicating the specific contents of the various instructions. Details of the command 500 is described later.

Further, in the present embodiment, the job 400 may not include the document data 410 itself. However, when the document data 410 is generated by the terminal 2, the document data 410 may be included in the job 400.

The document data 410 is a file such as a document, which is acquired by the server 1 or is included in the job 400. The document data 410 is, for example, HTML (Hyper Text Markup Language), XML (Extensible Markup Language), PS (Post Script) file, PDL (Page Description Language) file, electronic document file such as PDF (Portable Document Format) or the like, a text file, a file of various applications 420 such as word processors, spreadsheets, presentation software, or the like, and the other file capable to be outputted by printing. The document data 410 may also include image data and other binary data.

The document data 410 may be, for example, HTML, PDF data, or the like, in which user data is written in the form of the application 420 of the terminal 2, as job information or a medical document. In the case of the job information, for example, the personal information of the user may be described. Otherwise, in the case of a medical document, patient information, medical history, or the like, may be described. The document data 410 may be encrypted, and a password, or the like, may be set.

The application 420 is a file of various applications. The application 420 includes various applications that can be specified by the command 500, and they can be installed and executed on the server 1. Specifically, the application 420 may be, for example, a web browser, a PDF viewing application, a word processor application, a spreadsheet application, a presentation application, or the like. Different applications of the same type may be installed, and the one specified in the request of command 500 as described later may be executed. Alternatively, a specific application 430 may be executed for each type of document data 410.

The output data 430 is data of a file that can be printed or a file that can be acquired and viewed by the user. The output data 430 is, for example, PDL data that can be image-formed by the image forming apparatus 3, electronic document files such as PDF, or the like, e-mail, facsimile data, image data, and various other files, or the like.

(Details of Command 500)

Here, with reference to FIG. 6, the command 500 added to the job 400 is described. The command 500 may be, for example, added to the job 400 as metadata in a table format data, tag data, or the like.

FIG. 6 shows an example of the data included in the job 400 as the command 500 in a table format.

"Type" is a data indicating the type of the document data 410, which is acquired or is included in the job 400. In the example of FIG. 6, "HTML" is specified.

"Source" is a data indicating the acquisition destination of the document data 410. For the acquisition destination, for example, a URL, an address of a file repository on NAS or SNS, and the like, are set. The acquisition destination address may be a local address on the LAN or an address on the cloud. Alternatively, it is possible to set the file itself uploaded in the form as the acquisition destination. Also, is possible to set as the job 400 includes the document data 410. In the example of FIG. 6, the URL is specified.

"Request" is data that specifies the application 420 that acquires and renders the document data 410. In the example of FIG. 6, a web browser "Safari-park" that acquires and renders HTML data is specified.

In addition, the request does not have to be set. Alternatively, in the request, the type of the document data 410 may be set as the specific document data 410.

"Destination" is data indicating the destination of the output data 430. For the destination, for example, the IP address or URL of the image forming apparatus 3, e-mail address, SMS telephone number, or the like, is set according to the type of output. In the example of FIG. 6, one IP address of the image forming apparatus 3 is directly specified.

"Schedule" is the data of the output schedule setting. This setting includes the setting when job 400 is executed repeatedly or at a specified time. The schedule can be set, for example, unset, output at a set time, output for each set date or time, output by specifying a day of the week, and the like. In the example of FIG. 6, the document data 410 is acquired every 24 hours, rendered, and output.

As "Print settings", various settings such as color or monochrome print settings, page position, number of copies, and aggregate printing, or the like, can be set as output settings in the image forming apparatus 3. The print setting can also be set for a pull print, or the like. In the pull print, the job 400 is designated, or the like, and it is output from the operation panel unit 36 of the image forming apparatus 3. Further, the print setting may include a password setting and the like. The password may be set, for example, a character and number password, a PIN (Personal Identification Number), biometric information, or the like. Further, the password setting may also be used when printing the output data 430 or the document data 410 with the image forming apparatus 3 by pull print.

Here, the control unit 10 of the server 1 is made to function as the job acquisition unit 100, the command analysis unit 110, the document acquisition unit 120, the rendering unit 130, and the output transmission unit 140 by executing the control program stored in the storage unit 19.

The control unit 20 of the terminal 2 is made to function as the job acquisition unit 100 and the command analysis unit 110 by executing the control program stored in the storage unit 29.

The control unit 30 of the image forming apparatus 3 is made to function as the output data acquisition unit 300 by executing the control program stored in the storage unit 39.

Further, each part of the server 1, the terminal 2, and the image forming apparatus 3 as described above becomes a hardware resource for executing the image forming method of the present disclosure.

In addition, a part or any combination of the above-mentioned functional unit may be configured in hardware or circuit by IC, programmable logic, FPGA (Field-Programmable Gate Array), or the like.

[Integrated Command Printing Process by Image Formation System X]

Figure 7:
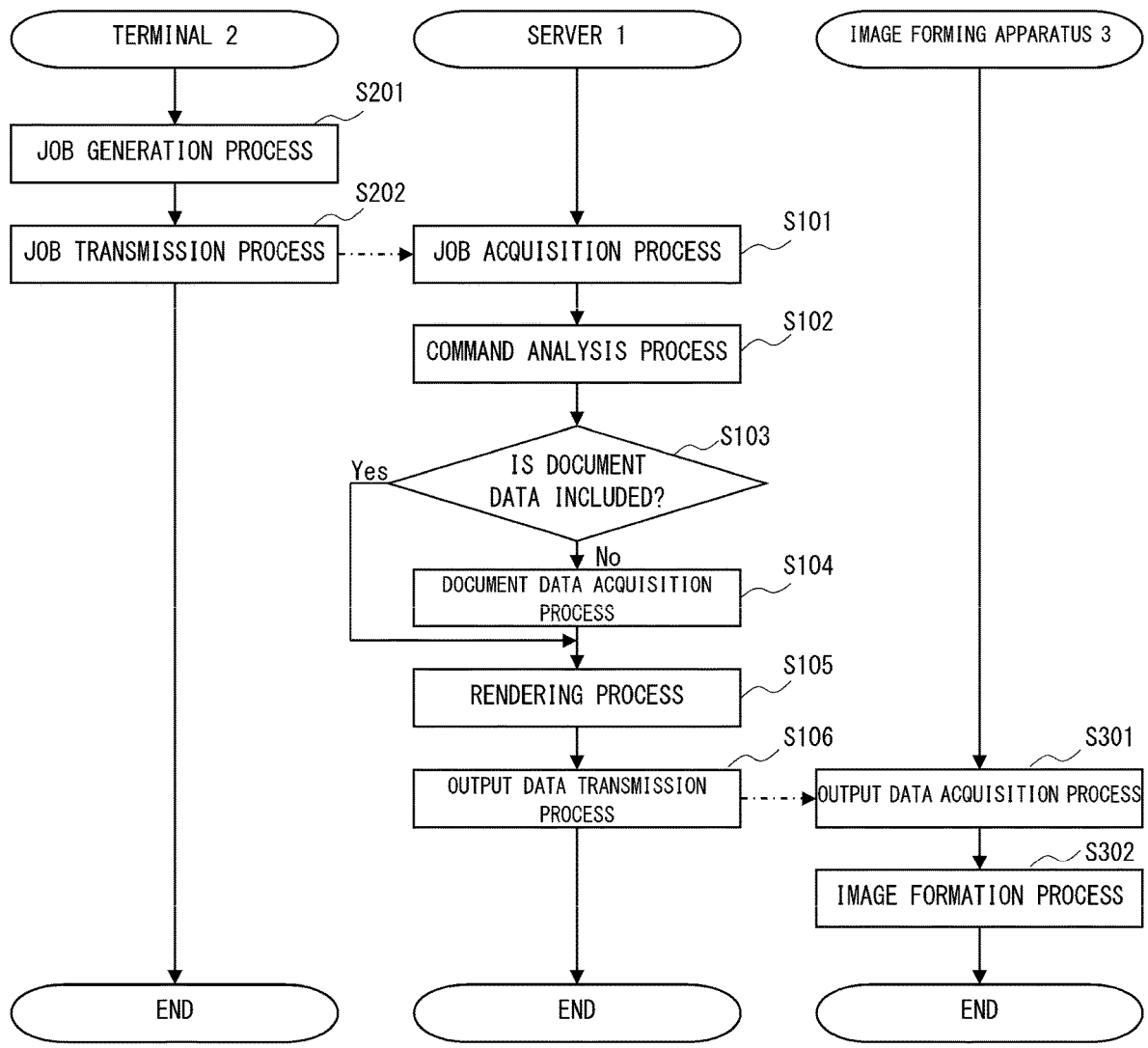
FIG. 7 is a flowchart of the command printing process according to the embodiment of the present disclosure.

Next, with reference to FIGS. 7 to 8, the integrated command printing process by the image forming system X according to the present embodiment is described.

In the integrated command printing process of the present embodiment, mainly, the control units 10, 20, and 30 of each apparatus execute the programs stored in the storage units 19, 29, and 39, respectively, collaborating with the respective units and use hardware resources.

Hereinafter, with reference to the flowchart of FIG. 7, the details of the integrated command printing process according to the present embodiment is described step by step.

(Step S201)

First, the job generation unit 200 of the terminal 2 performs the job generation process.

Here, various applications are executed on the terminal 2. On the application, by using GUI (Graphical User Interface) of OS, a user's instruction is obtained from the input unit 26. As a result, the job generation unit 200 can acquire various instructions of the command 500 and generate the job 400.

Specifically, for example, the job generation unit 200 generates a job 400 in response to a user's printing instruction in various applications via the device driver.

At this time, for non-editable documents such as HTML, PDF, and the like, the job generation unit 200 sets only the above-mentioned acquisition destination information in the command 500 of the job 400. Specifically, the job generation unit 200 adds a command 500 including an acquisition destination of the document data 410 to the job 400, for example, as metadata. Further, the type of document data 410, and the like, are also set in the command 500 of the job 400. The job generation unit 200 can also add the print settings, or the like, of the command 500 of the job 400 as metadata.

Alternatively, the job generation unit 200 may include the document data 410 of the editable document edited and created by the user from various applications in the job 400. In this case as well, the job generation unit 200 adds the command 500 set to include the document data 410 to the job 400.

Further, the job generation unit 200 may generate the job 400 from the application 420, which is dedicated for the image forming system X, and add the command 500.

(Step S202)

Next, the job transmission unit 210 performs the job transmission process.

The job transmission unit 210 transmits the job 400 to the server 1 via the network 5. At this time, the job transmission unit 210 transmits the job 400 to which the command 500 is added. As described above, the job 400 may or may not include the document data 410 created by the user.

Element "A" of FIG. 8 shows an example in which the job 400 is transmitted from the terminal 2 to the server 1.

(Step S101)

Here, the job acquisition unit 100 of the server 1 performs the job acquisition process.

The job acquisition unit 100 acquires the job 400 from the terminal 2 via the network 5 and stores it in the storage unit 19. The job 400 may be queued and the following processes may be executed in order.

(Step S102)

Next, the command analysis unit 110 performs command analysis process.

The command analysis unit 110 analyzes the command 500 included in the job 400, which is stored in the storage unit 19, for example, by parsing a tag, a table, or the like.

The command analysis unit 110 acquires the settings of the above-mentioned type, source, request, destination, schedule, print settings, or the like, included in the command 500.

(Step S103)

Next, the document acquisition unit 120 determines whether or not the job 400 includes the document data 410. The document acquisition unit 120 determines Yes if the job 400 is an editable document, or the like, as described above, and the document data 410 is included. The document acquisition unit 120 determines No in other cases, that is, if the job 400 does not include the document data 410, and only the acquisition destination of the document data 410 is specified in the source of the command 500.

In the case of Yes, the document acquisition unit 120 advances the process to step S104.

If No, the document acquisition unit 120 advances the process to step S105.

(Step S104)

If the job 400 does not include the document data 410, the document acquisition unit 120 performs the document data acquisition process.

The document acquisition unit 120 acquires the document data 410 from the acquisition destination included in the source of the command 500. The document acquisition unit 120 may execute this acquisition by the application 420 specified in the request of the command 500. Specifically, for example, the document acquisition unit 120 and the rendering unit 130 can execute the application 420 by RPA (Robotic Process Automation) technology, a command line call, a script execution, or the like.

Further, the document acquisition unit 120 can acquire the document data 410 according to the schedule of the command 500.

According to element B of FIG. 8, for example, the document acquisition unit 120 can acquire the document data 410 from another location on the network 5. More specifically, according to the example of command 500 in FIG. 6, the document acquisition unit 120 acquires the HTML file on the URL by the application 420 of the "Safari-park" web browser on a repeating schedule every 24 hours. In this case, receiving updated weather information can be performed by the HTML of the website specified in the URL indicating which place the weather information is.

(Step S105)

Next, the rendering unit 130 performs the rendering process.

Here, in the present embodiment, the document is not rendered on the terminal 2, but it is executed on the server 1.

Specifically, the rendering unit 130 renders the acquired document data 410 to generate output data 430. At this time, the rendering unit 130 renders the acquired document data 410 with the application 420 specified by the request of the command 500.

For example, in the example of the command 500 of FIG. 6, the "print" of the document data 410 is executed by the "Safari-park" browser. As a result, output data 430 in which the HTML is rendered is generated.

Similarly, for example, even if it is an HTML file, if the request is a "Chronic" browser, "print" is executed in this browser. In this case, output data 430 whose rendering result is different from that of the "Safari-park" browser is generated.

Alternatively, if the type of the command 500 is a specific type, the rendering unit 130 may be able to execute rendering in the specific application 420 that has been set even if the request has not been set. For example, if the type is PDF, it may be set to render with "Adobe (registered trademark) Acrobat Reader (registered trademark)".

Alternatively, when the document data 410 is included in the job 400, the rendering unit 130 may perform rendering by using the application 420 in which the document data 410 is generated. Specifically, for example, when a form is inputted in "Adobe (registered trademark) Acrobat (registered trademark)", rendering may be performed by this application 420.

By these rendering processes, regardless of the device driver of the terminal 2 and the environment of the application 420, the output data 430 having the same rendering result can be acquired.

(Step S106)

Next, the output transmission unit 140 performs the output data transmission process.

The output transmission unit 140 transmits the output data 430 rendered by the rendering unit 130 to the image forming apparatus 3 via the network 5.

Element C of FIG. 8 shows an example in which the output data 430 is output to the image forming apparatus 3.

Alternatively, the output transmission unit 140 can also transmit the output data 430 by e-mail transmission, SMS (short message) transmission, facsimile transmission, or the like. At this time, the output transmission unit 140 can refer to the destination according to the output destination of the command 500, specify a plurality of users or groups, or set a mailing list, or the like, as the output destination. At the time of this transmission, the output data 430 may be protected by the password specified in the print setting of the command 500.

(Step S301)

Here, the output data acquisition unit 300 of the image forming apparatus 3 performs the output data acquisition process.

The output data acquisition unit 300 acquires the output data 430 from the server 1 via the network 5 and stores it in the storage unit 39.

(Step S302)

Then, the image forming unit 37 performs an image forming process.

The image forming unit 37 forms an image of the acquired output data 430 on a recording paper in a format according to the print setting and outputs it.

At this time, the output data 430 may be output after the user is logged in on the operation panel unit 36 to acquire the same instruction as the pull print. In this instruction, a preview display of the output data 430 may be performed.

Further, it is possible to change the output format of the output data 430 and output it.

As described above, the integrated command printing process according to the embodiment of the present disclosure is completed.

As configured in this way, the following effect can be obtained.

In a typical pull print process, a print job is rendered on a terminal side and printable PDL data is generated by using the application and the device driver of the image forming apparatus. This PDL data was processed and printed out by an image forming apparatus. However, the quality and appearance of this printed matter differed depending on the environment of using application, device driver, or the like. For example, the print results of the websites printed by the web browsers "Safari (registered trademark)" and "Chrome (registered trademark)", respectively, are different.

For this reason, there is a demand for output in the same manner regardless of these environments.

On the other hand, the image forming system X according to the present embodiment is an image forming system including a terminal 2, a server 1, and an image forming apparatus 3, wherein the terminal 2 includes: a job generating unit 200 that generates a job 400 and adds a command 500 that includes a document acquisition destination to the job 400, and a job transmission unit 210 that transmits the job 400 to which the command 500 is added by the job generation unit 200; the server 1 includes: a job acquisition unit 100 that acquires the job 400 from the terminal 2, a command analysis unit 110 that analyzes the command 500 included in the job 400 acquired by the job acquisition unit 100, a document acquisition unit 120 that acquires the document data 410 from the acquisition destination according to the command 500 analyzed by the command analysis unit 110, a rendering unit 130 that renders the document data 410 acquired by the document acquisition unit 120 and generates output data 430, and an output transmission unit 140 that transmits the output data 430 rendered by the rendering unit 130; and the image forming apparatus includes: an output data acquisition unit 300 that acquires the output data 430, and an image forming unit 37 that form an image of the output data 430.

With this configuration, the job 400 to which the command 500 is added is sent to the server 1, and the entire rendering of the job 400 is performed on the server 1 side. As a result, the same output data 430 can be output regardless of the environment such as the application 420 and the device driver used by the terminal 2. That is, as integrated command printing on the network, it is possible to output with the same quality regardless of the application 420 or the printer driver used. Therefore, it is useful to output with the same quality regardless of the application. Also, the processing load of the terminal 2 can be reduced, and job 400 can be reliably transmitted and output.

Further, in the server 1 according to the present embodiment, the rendering unit 130 is that rendering is performed by using the set application 420.

With this configuration, it is possible to output with a specific application 420. Further, even if the application 420 is not installed on the terminal 2, the output by the designated application 420 is possible. For example, it is also possible to output the set application 420 for each type of document data 410.

Further, in the server 1 according to the present embodiment, the command 500 includes a request designated by the application 420 requesting rendering, and the rendering unit 130 performs rendering using the application 420 specified by the request of the command 500.

With this configuration, printing with the application 420 intended by the user becomes possible. For example, even with the same web browser, different ones such as "Safari (registered trademark)" or "Chrome (registered trademark)" can be directly specified.

Further, in the server 1 according to the present embodiment, the command 500 includes setting an output schedule, and the document acquisition unit 120 acquires a document according to the schedule set by the command 500.

With this configuration, the particular job 400 can be scheduled to repeat without user intervention. For example, when it is desired to print the weather forecast periodically, the latest document data 410 can be acquired and outputted. Therefore, the time and effort of the user can be reduced, and the execution of the job 400 can be made more efficient.

Further, in the server 1 according to the present embodiment, the command 500 includes setting a destination and a password for the output data 430.

With this configuration, it is possible to give permission to access the document and safely handle the document data 410 that includes the user's personal information such as job information and medical information. In addition, security can be ensured by using this password or the like in the pull print.

Other Embodiments

In the above-described embodiment, it has been described that the server 1 acquires, renders, and the like the job 400.

However, it is also possible to configure the image forming apparatus 3 to have the function of the server 1. That is, the image forming apparatus 3 may be an information processing apparatus. In this case, the image forming apparatus 3 forming an image to output it and the image forming apparatus 3 having the function of the server 1 may be separate or plural.

With this configuration, each of the above-mentioned integrated command printing processes can be performed without separately providing the server 1. Therefore, the cost can be reduced.

In the above-described embodiment, an example in which a password is set in the print setting of the command 500 has been described.

In addition to this, a setting such as output restriction by a user ID may be added. In addition, a setting may be added so that a specific application 420 or type of application 420 can be specified at the time of the pull print-like output. Further, there may be a setting that the encryption is performed only when the data is transmitted by e-mail or SMS.

With such a configuration, the more intended output by the user can be made possible, or the safety measure can be enhanced.

In the above-described embodiment, the print (output) job is mainly described as the job 400. However, the job 400 of the present disclosure may be a network scan, a network facsimile transmission, or other job in addition to the print job.

In the above-described embodiment, an example of acquiring the document data 410 on the server 1 has been described.

However, the document data 410 may be read by the document reading unit 32 of the image forming apparatus 3. In this case, such setting may be set in the source of the command 500, and the document data 410 may or may not be sent to server 1.

Further, the present disclosure can be applied to an information processing apparatus other than the image forming apparatus. That is, a network scanner, a server to which the scanner is separately connected by USB, or the like, may be used.

Further, it goes without saying that the configuration and operation of the above-described embodiment are examples, it and can be appropriately modified and executed without departing from the gist of the present disclosure.

What is claimed is:

1. An image forming system having a terminal, an information processing apparatus, and an image forming apparatus, wherein the terminal includes:
a job generating unit configured to generate a job and adds a command that includes a document acquisition destination to the job, and
a job transmission unit configured to transmit the job to which the command is added by the job generation unit;

the information processing apparatus includes:
a job acquisition unit configured to acquire the job from the terminal,
a command analysis unit configured to analyze the command included in the job acquired by the job acquisition unit,
a document acquisition unit configured to acquire the document from the acquisition destination according to the command analyzed by the command analysis unit,
a rendering unit configured to make an application render the document acquired by the document acquisition unit and make the application generate output data, and
an output transmission unit configured to transmit the generated output data and the image forming apparatus includes:
an output data acquisition unit configured to acquire the output data, and
an image forming unit configured to form an image of the output data; and wherein
the application is specifiable from among different applications even when the different applications correspond to the same type of the document to which the application corresponds.

2. The image forming system according to claim 1, wherein
the rendering unit renders by using a set application software when the application is not specified.

3. The image forming system according to claim 1, wherein
the command includes specification of the application software requesting the rendering, and
the rendering unit renders by using the application software specified by the command.

4. The image forming system according to claim 1, wherein
the command includes setting of output schedule, and
the document acquisition unit acquire the document according to the schedule set by the command.

5. The image forming system according to claim 1, wherein
the command includes setting of destination and password of the output data; and wherein
the command is included within the job.

6. An information processing apparatus for an image formation system, comprising:
a job acquisition unit configured to acquire a job from a terminal;

a command analysis unit configured to analyze the command included in the job acquired by the job acquisition unit;

a document acquisition unit configured to acquire the document from an acquisition destination added in the command analyzed by the command analysis unit;

a rendering unit configured to make an application render the document acquired by the document acquisition unit and make the application generate output data; and an output transmission unit configured to transmit the generated output data; wherein the application is specifiable from among different applications even when the different applications correspond to the same type of the document to which the application corresponds.

7. The information processing apparatus according to claim 1, wherein the rendering unit render by using set application software when the application is not specified.

8. The information processing apparatus according to claim 1, wherein the command includes specification of the application software requesting the rendering, and the rendering unit renders by using the application software specified by the command.

9. The information processing apparatus according to claim 1, wherein the command includes setting of output schedule, and the document acquisition unit acquire the document according to the schedule set by the command.

10. The information processing apparatus according to claim 1, wherein the command includes setting of destination and password of the output data; and the command is included within the job.

11. An information processing method executed by an information processing apparatus of an image forming system, comprising the steps of:

acquiring a job from a terminal;

analyzing a command included in acquired job;

acquiring a document from an acquisition destination added in the command;

making an application render the acquired document and making the application generated output data; and transmitting generated output data; wherein the application is specifiable from among different applications even when the different applications correspond to the same type of the document to which the application corresponds.

12. The image forming method according to claim 11, wherein the rendering is performed by using set application software when the application is not specified.

13. The image forming method according to claim 11, wherein the command includes specification of the application software requesting the rendering, and the rendering is performed by using the application software specified by the command.

14. The image forming method according to claim 11, wherein the command includes setting of output schedule, and the acquiring the document is performed according to the schedule set by the command.

15. The image forming method according to claim 11, wherein the command includes setting of destination and password of the output data; and the command is included within the job.

16. The image forming system according to claim 1, wherein the document acquisition unit causes the application to acquire the document by executing the application.

17. The image forming system according to claim 16, wherein said executing the application occurs by RPA (Robotic Process Automation) technology, a command line call, or a script execution method.

18. The image forming system according to claim 3, wherein even when the application is not specified in a command that is analyzed, rendering is executed in the specific application that is set.

19. The information processing system according to claim 1, wherein the different applications are configured to produce different rendering results, relative to each other, from rendering the document.

20. The information processing apparatus according to claim 6, wherein the different applications are configured to produce different rendering results, relative to each other, from rendering the document.

* * * * *